United States Patent [19]
Dunlap et al.

[11] Patent Number: 5,194,963
[45] Date of Patent: Mar. 16, 1993

[54] DUAL DECK VIDEOCASSETTE RECORDER SYSTEM

[75] Inventors: R. Terren Dunlap, Scottsdale; John B. Berkheimer, Tempe, both of Ariz.; C. Duane Woodmas, Emporia, Kans.

[73] Assignee: Go-Video, Inc., Scottsdale, Ariz.

[21] Appl. No.: 230,181

[22] Filed: Aug. 9, 1988

[51] Int. Cl.[5] .................... H04N 9/80; H04N 9/88
[52] U.S. Cl. .................... 358/314; 358/316; 358/321; 358/343; 360/15; 360/38.1; 369/84
[58] Field of Search ............ 358/181, 191.1, 314, 358/315, 316, 318, 321, 335, 341, 343; 360/14.1–14.3, 15, 33.1, 38.1, 61–63, 73.02, 73.04, 73.11, 77.12–77.14, 77.16; 369/6–7, 12, 84

[56] References Cited

U.S. PATENT DOCUMENTS

| | | | |
|---|---|---|---|
| 3,560,666 | 2/1971 | Bookman | 369/7 |
| 3,620,476 | 11/1971 | Cervantes | 360/15 X |
| 3,767,206 | 10/1973 | Rehklau et al. | 360/15 |
| 4,224,643 | 9/1980 | Nakano et al. | 360/73.11 X |
| 4,251,830 | 2/1981 | Tatami | 358/320 |
| 4,272,790 | 6/1981 | Bates | 360/14.1 |
| 4,276,562 | 6/1981 | Stewart et al. | 369/7 X |
| 4,396,941 | 8/1983 | Nishimura et al. | 369/7 X |
| 4,400,742 | 8/1983 | Yamamitsu et al. | 358/318 |
| 4,404,601 | 9/1983 | Sakamoto | 360/77.16 X |
| 4,543,618 | 9/1985 | Sato | 360/15 |
| 4,577,239 | 3/1986 | Sougen | 360/15 |
| 4,630,133 | 12/1986 | Long | 358/335 |
| 4,651,230 | 3/1987 | Hagita et al. | 358/314 |
| 4,768,110 | 8/1988 | Dunlap et al. | 360/33.1 |

FOREIGN PATENT DOCUMENTS

| | | | |
|---|---|---|---|
| 2013865 | 2/1983 | United Kingdom | 360/15 |
| 2164194 | 3/1986 | United Kingdom | 360/31 |

OTHER PUBLICATIONS

Sharp Model VC-5W20E Owner's Manual, May 1988.

Primary Examiner—Roy N. Envall, Jr.
Assistant Examiner—W. R. Young
Attorney, Agent, or Firm—Jerry Cohen; Harvey Kaye; Edwin H. Paul

[57] ABSTRACT

A videocassette deck and taping system includes two videocassette decks therefor (A and B) included within a single housing utilizing a common power supply, tuner, controls, and switching and control circuitry to enable simultaneous multiple functions using both decks and to also enable tape to tape duplication (dubbing) in a manner avoiding degradation of video information content, as well as additional function selection.

2 Claims, 9 Drawing Sheets

DUAL DECK VIDEOCASSETTE RECORDER SYSTEM

FIELD OF THE INVENTION

This invention relates to a dual deck videocassette recorder ("VCR") system that enables the user to have two decks available for selective simultaneous functions, including playback and recording capability of the system such that pre-recorded material can be transferred from a videocassette tape in one such deck to a blank tape in the other deck. Related subject matter appears in the Dunlap-Lang application, Ser. No. 07/048,521, filed May 8, 1986 (as a continuation of Ser. No. 06/652,820, filed Sep. 20, 1984, now abandoned), and now U.S. Pat. No. 4,768,110, granted Aug. 30, 1988.

The present invention provides an integrated (single chassis, single tuner, single power supply, single control set) dual-deck VCR system usable with a fully featured television set or with one or more components of a video system (e.g., antenna, monitor, tuner) enabling play of a pre-recorded videocassette tape from one deck of the dual deck VCR system to an associated television set or monitor while simultaneously recording an off-the-air broadcast to a videocassette tape in the other deck of the dual-deck VCR system.

BACKGROUND OF THE INVENTION

One of the features of the present invention is the ability, in context of a dual-deck VCR system, to duplicate "high quality" videocassette tapes (specifically, those videocassette tapes with azimuth recording characteristics as used in home-consumer VCR's) with good fidelity and avoidance of copy degradation where a copy is made from a copy in two or more generations.

A further feature of the invention is the maintenance of the integrity of pre-encoded copyright protection systems in a manner that makes defeat of protection systems by ordinary consumer devices (generally referred to as "video stabilizers" or "black boxes") impracticable.

The user of the consumer grade azimuth-recorded videocassette tapes can, with this invention, simply and easily duplicate (or dub) tape contents from one (source tape) to the other (target tape) through FM dub circuitry provided in this invention to achieve a clear, high-quality, videocassette target tape which is indistinguishable from the original (source) videocassette tape. Further, several generations of duplicated videocassette tapes maintain the high quality visual characteristics of the original videocassette recording.

Azimuth-recorded videocassette tapes can, with the present invention, be pre-encoded with a signal (or various signals) that actuate the circuitry of the dual-deck VCR system to prevent the duplication of said tapes (through a closed, sealed circuit device which makes it impracticable and cost prohibitive for the consumer to bypass this system and impossible to use a video stabilizer and still maintain the quality as provided by the dub circuitry of the invention).

Commercial "reel-to-reel" videotape recording (VTR) was introduced to the public by the U.S. company, Ampex, Inc., in 1956. In 1969 Sony Corporation (Japan), and its U.S. marketing subsidiary, introduced the first ¾-inch U-Matic "videocassette" recording (VCR) unit for commercial broadcast TV studio recording purposes. These systems although excellent for broadcast TV studio purposes had major drawbacks for home-consumer uses (i.e., expensive, occupied too much space-large footprint, cumbersome, complicated to use, short recording time capacity). This capacity problem and some portion of the other shortcomings were caused by the excessive space required in the recording method used to lay the signal on the videotape. Space needs were generated by (1) the large size of the recording heads' gap (85 microns) and (2) the necessity of a guard band (the unrecorded space or distance between the recorded information of the video track) on the tape to prevent "cross-talk."

Although azimuth recording was patented in 1958 it wasn't perfected until 1974 when Sony introduced the Betamax brand ½-inch VCR designed for the home consumer and comprising the feature that slant azimuth recording was incorporated into videocassette recorders by using smaller narrow gapped heads (58 microns). Azimuth recording uses two heads mounted with head gaps at angles slightly off perpendicular to the head path (at a six degree angle to true perpendicular to direction of the head), one slanted to the left and the other to the right. This azimuth head configuration reduces cross-talk and eliminates the wasted, unused space that was required on the bulky commercial VTR's and ¾-inch VCR's.

Matsushita and Victor Company of Japan (JVC) immediately introduced their version of a consumer VCR format, viz: ½-inch VHS (Video Home Systems), which incorporated the azimuth recording system but also extended the recording time to six hours using T-120 tape or eight hours using T-160 tape. This was accomplished by using a smaller recording head gap (29 microns), by creating a one-half track width and by slowing down the running speed of the tape.

VCR technology was then commercially practicable at a consumer market level as the cost had been reduced, the machines were smaller, the cassettes were pocket book size, the loading of tapes and operations was now simple and a long series of television programs could be recorded. With the addition of a tuner/timer, time shifting was available so the user could watch programs during leisure time.

The introduction of VHS and Beta for consumer recording of broadcast television shows immediately raised the question of legality of selling the VCR machines, which was resolved by a U.S. Supreme Court decision in 1984 (Sony Corp. of America v. Universal Studios, 464 U.S. 417 (1984), favor of continued sale. The door was opened for order of magnitude expansion in the U.S. sale of VCR's. This was followed by a proliferation of videocassette recordings from various sources (i.e., home movies, business productions, educational programs, news releases, etc.) and many VCR owners began wiring their single deck machines together to make copies of their tapes. However, the quality of the copies made by wiring two VCR's was and is marginal.

A major problem of such copying was and is the inability to effectively transfer an azimuth recorded video signal and lay it on a blank tape in the same azimuth format without loss of signal, the creation of noise and the experience of severe degradation of signal. Several efforts of the art to solve the problem included video enhancers, detailers and other such means to fill in or alter signals but none of these devices could "save" the original azimuth recorded signal in an unaltered state for duplication of like kind and quality.

It is, therefore, the object of the present invention to overcome the prior-art drawbacks of dubbing technique and apparatus.

It is a further object of the invention to enhance the usefulness of videocassette recorder (VCR) systems.

It is a further object of the invention to provide a low cost, mass-marketable dual deck videocassette recorder system which is easy to understand and use, reliable and multi-functional, with a range of selectable useful operations for entertainment, educational and/or business purposes.

SUMMARY OF THE INVENTION

The present invention which solves the above described tape duplication problems is related to the following retrospective analysis made with benefit of the present invention itself. The major road block of the state-of-the-art was created by the modulation and demodulation process which is inherent in any single deck consumer ½-inch VCR. Conventional single deck VCR's modulate outgoing signals to prepare the signal for transmission to the monitor and demodulate incoming signals to prepare the signal for azimuth recording on the tape. Therefore, the conventional method for duplicating videotapes from one VCR to another (i.e., VHS to VHS, Beta to Beta) was accomplished by inserting a pre-recorded cassette into one VCR and a blank tape into a second VCR. The video "out" from the first VCR was cabled to the video "in" of the second VCR and the separate recorders were turned on. The second VCR was programmed to record information input to it and the first VCR was programmed to play the information recorded on it. When the VCRs were run, the information of the cassette in the first VCR was recorded onto the cassette in the second VCR, making a duplicate.

Another approach is to track the above process, with the exception that the corresponding RF or radio frequency is used as output and input. This alternative is less preferred since additional processing of the video signal is used to modulate the RF carrier output which is directly demodulated by the receiving VCR to produce the video again. This unnecessary modulation and demodulation further degrades the signal quality of the duplicate tape.

Apparently, video is used because that is what most VCR manufacturers provide as convenient output jacks. But successive duplication from tape to tape to tape and so on, using these artifacts, is detrimental to the quality of the signal recorded, although less so than when using the RF outputs and inputs. The deterioration in signal quality is due to the same reasons. The video signal, as defined in many handbooks, is not directly recorded onto the tape. Instead an FM or frequency modulated signal is recorded onto the tape. Thus when a duplicated tape is made by using the video signals, there is an unnecessary and redundant formation of the video from the FM and then the FM from the video which degrades the resultant signal recorded on the duplicated tape.

This use of cabling from one VCR to another (whether through video jacks or through RF jacks) creates a system of exposed connectors and cables. These connectors and cables are subject to several inherent shortcomings and problems. The length of the cables promotes degradation and interference of signals by picking up unwanted signals and the cables through exposure or use can become easily damaged causing a break or wear in the wire which can permit interference in the signal transferred. The connectors can easily become damaged or worn or broken through constant use or misuse and, therefore, cause interference in the signal transferred.

The present invention is directed to a videocassette recorder and taping system which includes at least two videocassette recorder decks receiving videocassette tape therein. An output selection switching means is provided for selection of the video output to a video monitor from among a plurality of signals including the signal from a videocassette tape in either of the first or the second decks and the input to the first VCR. Other standard signals which may be selectively directed through the output selection switch include a TV tuner, a video line, and a camera. A second selection switching means is also provided for selecting the desired recording input when one of the lines connected to this switch is also connected directly to the second videocassette deck. Thus, a prerecorded tape that is located in the first videocassette deck may be recorded on a blank videocassette tape located in the second videocassette deck while selection of a program for monitor viewing is unrestricted among the original alternatives. It is also seen that the proposed system provides the significant advantage that a prerecorded tape may be viewed during a recording session.

The complexity and problems that exist with cabling and jacks can be eliminated with internal wiring but only through the creation of a dual-deck VCR system with internal circuitry. The primary problem remains unresolved, "How can one eliminate the degradation of signal caused by modulation and demodulation and still prevent 'crosstalk' because part of the color process in converting from 629 KHZ to 358 MHZ helps eliminate the crosstalk?" This is required to process out the interference in the color signals to ensure quality and, therefore, preclude the ability to record color 629 KHZ to color 629 KHZ directly. It has been determined that the circuitry could be designed with minimal processing and maintaining a clean FM/629 dub transfer process which would allow the recording tape to preserve the original high definition signal coming from the prerecorded tape. An FM/629 dub circuit provided in accordance with the present invention comprises, primarily, an automatic gain control (AGC) amplifier, a dropout compensator with delay line, a buffer and then a high pass filter to separate luminance for passage through a limiter and equalizer plus a low pass filter to separate the color for passage through an AGC amp and then recombination with the luminance in a buffer. It was further discovered that the original azimuth recorded signal could be substantially maintained using the smaller (29 micron) heads at the standard play (SP-2 hours) speed because a guard band is created and, therefore, less processing is required.

Another unresolved problem that this invention addresses is the 'policing' of unauthorized duplications of copyrighted videocassettes. Copy-coding systems are being marketed and employed to protect encoded copyrighted videotapes from illegal or unauthorized copying.

Currently, all duplication of videocassette tapes is accomplished by cabling together two single deck VCRs. However, in response to video copy-coding systems, "video stabilizer" systems have been developed to interfere between the two single VCRs via the cabling system. The explicit purpose of "video stabalizer" devices is to intercept the video signal and unscramble the copy-coding system. Thus, the present method for duplicating videocassette tapes can be readily configured to defeat copy-coding systems.

The editing and duplication in the invention, dual-deck FM dub VCR, is accomplished through the internal circuitry of the system. Any attempts by a home consumer user to intercept the video signal through external cabling will be unsuccessful for three reasons: first, an external signal would have to pass through the demodulation-modulation process and would not be of original high quality for duplication process. Secondly, the copy code will be read by a sealed integrated circuit within the play machine electronic circuitry by the 'play' machine which will instruct the 'record' machine to scramble or not record the signal. Thirdly, the video stabilizer cannot be plugged into the sealed integrated circuits of the dual-deck VCR without substantial engineering, tooling and understanding and impracticable cost.

The combination of the dual-deck configuration and the FM dub feature with video copy-coding systems serves to provide significantly greater protection against unauthorized copying of encoded videocassette tapes.

Other objects, features, and advantages will be apparent from the following detailed description of preferred embodiments taken in conjunction with the accompanying drawings in which:

DETAILED DESCRIPTION OF PREFERRED EMBODIMENTS

Figure 1:
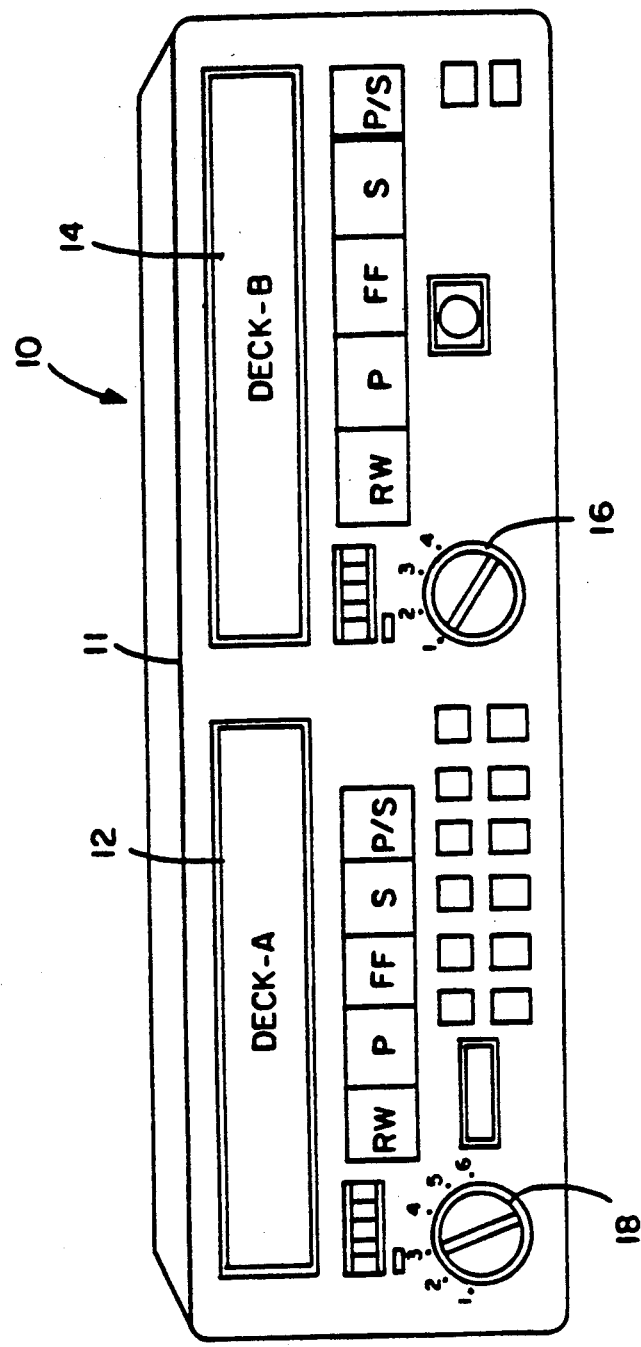
FIG. 1 is a front view of the control panel and housing of a dual deck VCR utilizing features of the present invention, according to a preferred embodiment thereof.

Referring now to the drawings and particularly to FIG. 1, the housing and front panel of a videocassette dual deck system providing off-air taping and play control and utilizing duplicating fetures hereinafter described and generally indicated at 10. The system 10 is contained within a single housing generally indicated at 11 and, as will be described, includes a dual deck arrangement for receiving conventional videocassette tape therein. The term "deck" as used herein comprises a platform for a videocassette, hubs for engaging drive wheels of the videocassette, motor means for driving one or both hubs, motor controls and electromagnetic electrostatic and/or optical transducer heads for exchange of control signals and information with the videotape medium of the videocassette. Each deck has an access port—12 for first deck A and 14 for second deck B. A first deck (designated as deck A in FIG. 1) may be used for playing a prerecorded video tape located in a cassette. A second deck (designated by deck B in FIG. 1) is used also for playing and recording videocassettes. An output selection switch 18 is located on the front of the housing 11 below the port 12 and, as will be described, selects a line which will be connected to the video monitor for viewing. A recording selection switch 18 is also located on the front of the housing 11 below the port 14 and is provided for selecting the input line from which a program or prerecorded material will be recorded onto a blank video tape cassette that has been inserted into deck B(14). The recording selection switch 16 is only used when a blank tape is inserted into port 14, deck B.

Figure 2:
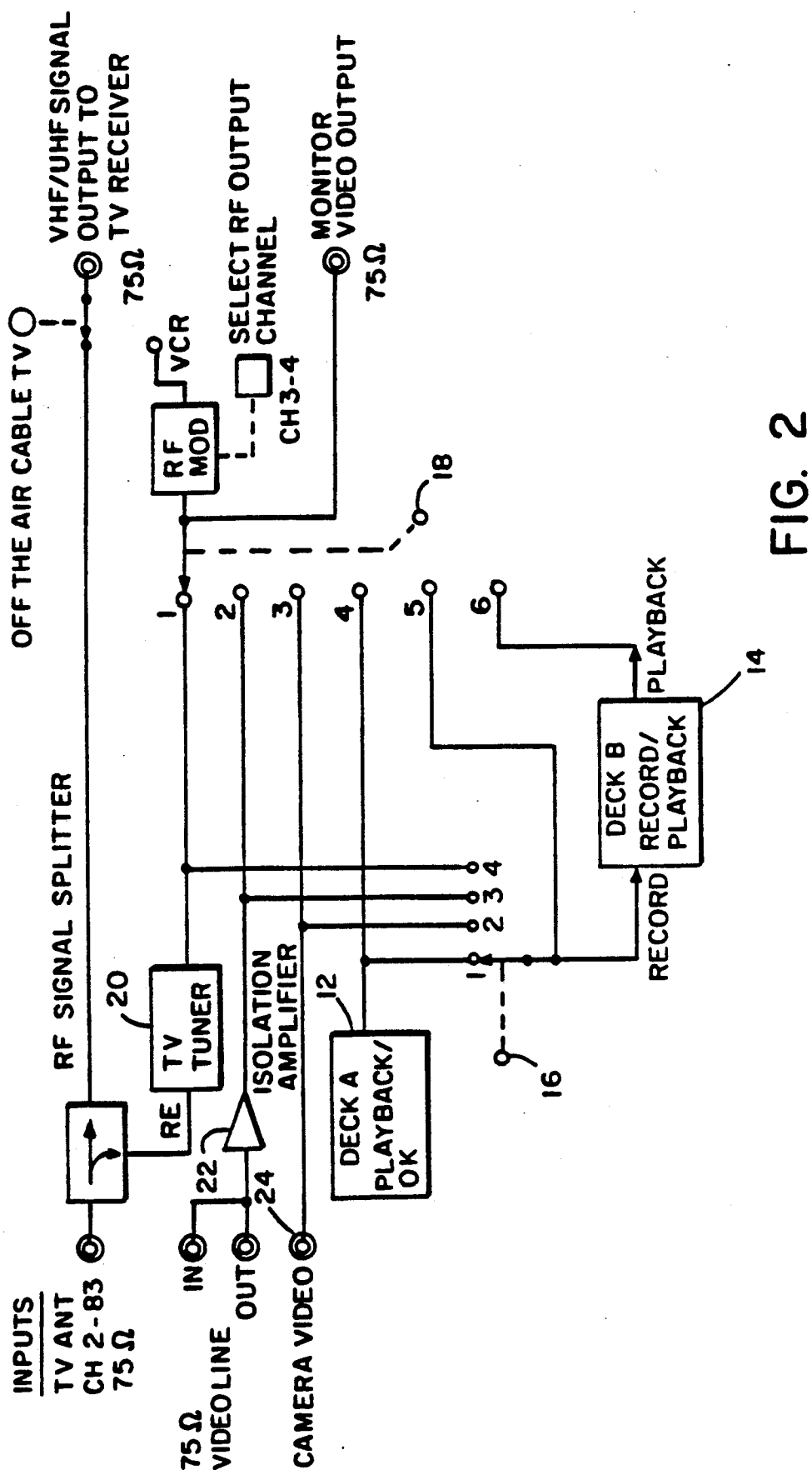
FIG. 2 is a circuit block diagram of a dual-deck VCR system of the present invention which can be associated with the FIG. 1 control panel and housing.

Referring now to FIG. 2, the videocassette deck and taping system according to a first preferred embodiment therefor is schematically illustrated and in this connection it is understood that the electrical components, as illustrated in block diagram form, are composed of conventional circuitry well known in the art except as otherwise specified herein. As shown in FIG. 2, the electrical inputs into the system include a TV signal that is directed through a TV tuner 20, a video input that is directed through an isolation amplifier 22, a camera video input socket 24, and (also as an "input") the first videocassette deck (Deck-A). All of the input signals are selectively directed into the first video cassette deck (Deck-B) that is accessed through the port 14 for recording onto a blank tape located therein. A first four position (1, 2, 3, 4) selection switch 16 can direct a selected one of the inputs to deck B and simultaneously to a second (output) switch 18 (with positions 1–6).

The input signals may also be directed to the TV monitor for video display thereon. For this purpose, the output selection switch 18 through the switch positions 1–6 thereof is moved to the appropriate position for selecting the desired signal among the six inputs for connection to the TV monitor. As shown in FIG. 2, the output line from the second videocassette deck B as selected by the output switch 18 is connected through switch position #6 thereof to the video monitor for viewing the program material of a videocassette in deck B.

The combination of the selection and output switches, 16 and 18, enables a versatility of operation that includes use of the selection switch 16 to record either a TV program through the TV tuner 20 that is connected to selection switch position #4, a video input that is connected to selection switch position #3, or a camera input that is connected to selection switch position #2, while at the same time viewing on the TV monitor a prerecorded tape that has been inserted into port 12 of Deck-A and by activating the play function on Deck-A and movement of the output switch 18 to position #4. It is also possible by use of the subject invention to duplicate material as prerecorded on a tape that is inserted into the videocassette recorded at port 12 of Deck-A by locating the selection switch 16 at position #1 while displaying the prerecorded program, which is accomplished by locating output switch 18 at position #5. In this manner, the material prerecorded on the for example, by leaving out commercials, on a blank cassette tape located in Deck-B. The videocassette located in Deck-A can then be viewed while the edited version is produced in Deck-B.

Figure 3A:
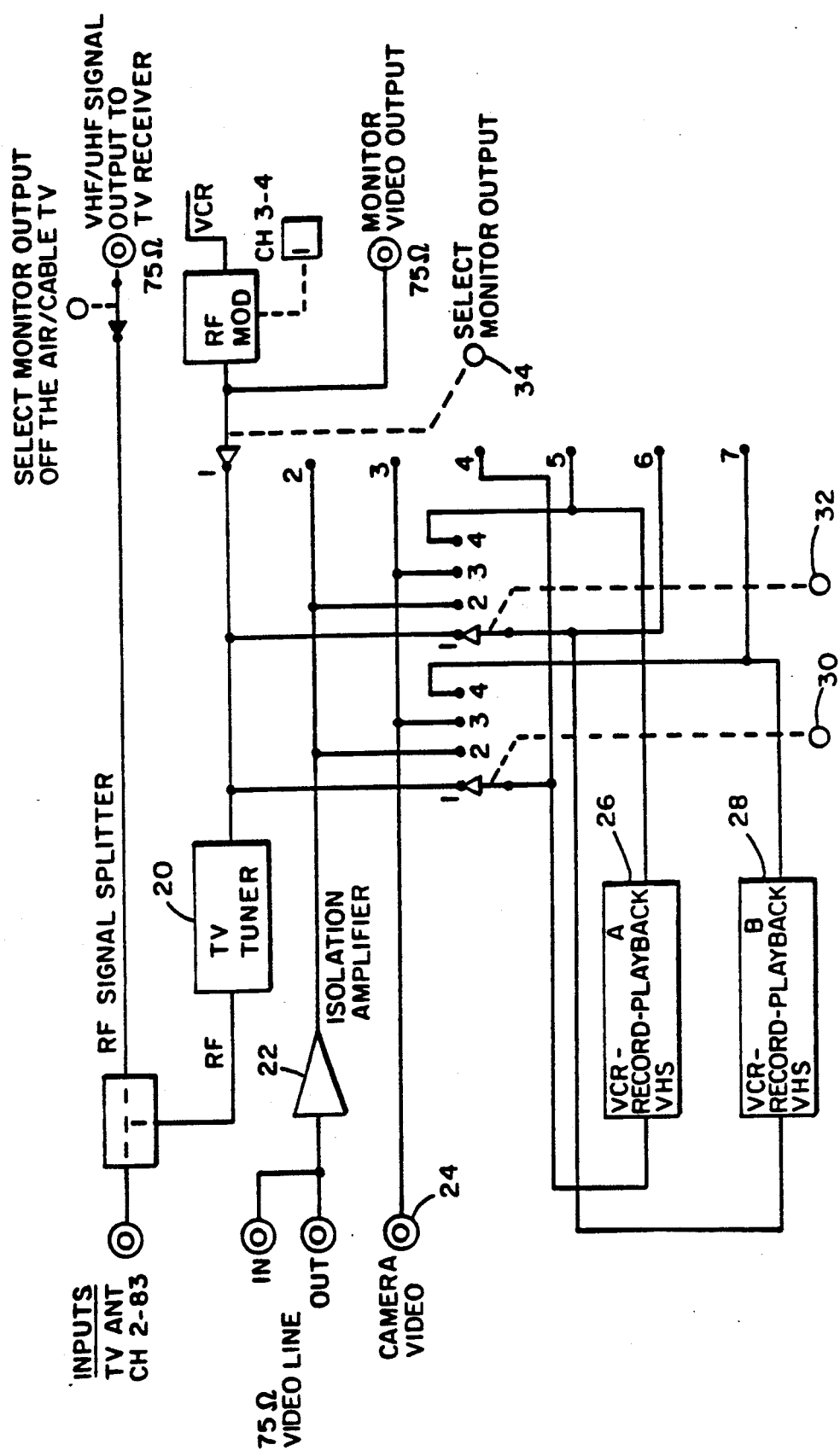
FIG. 3A is a circuit block diagram of a dual-deck VCR system of the present invention which can be associated with the FIG. 1 control panel and housing (but in a different preferred embodiment construction relative to FIG. 2)
Figure 3B:
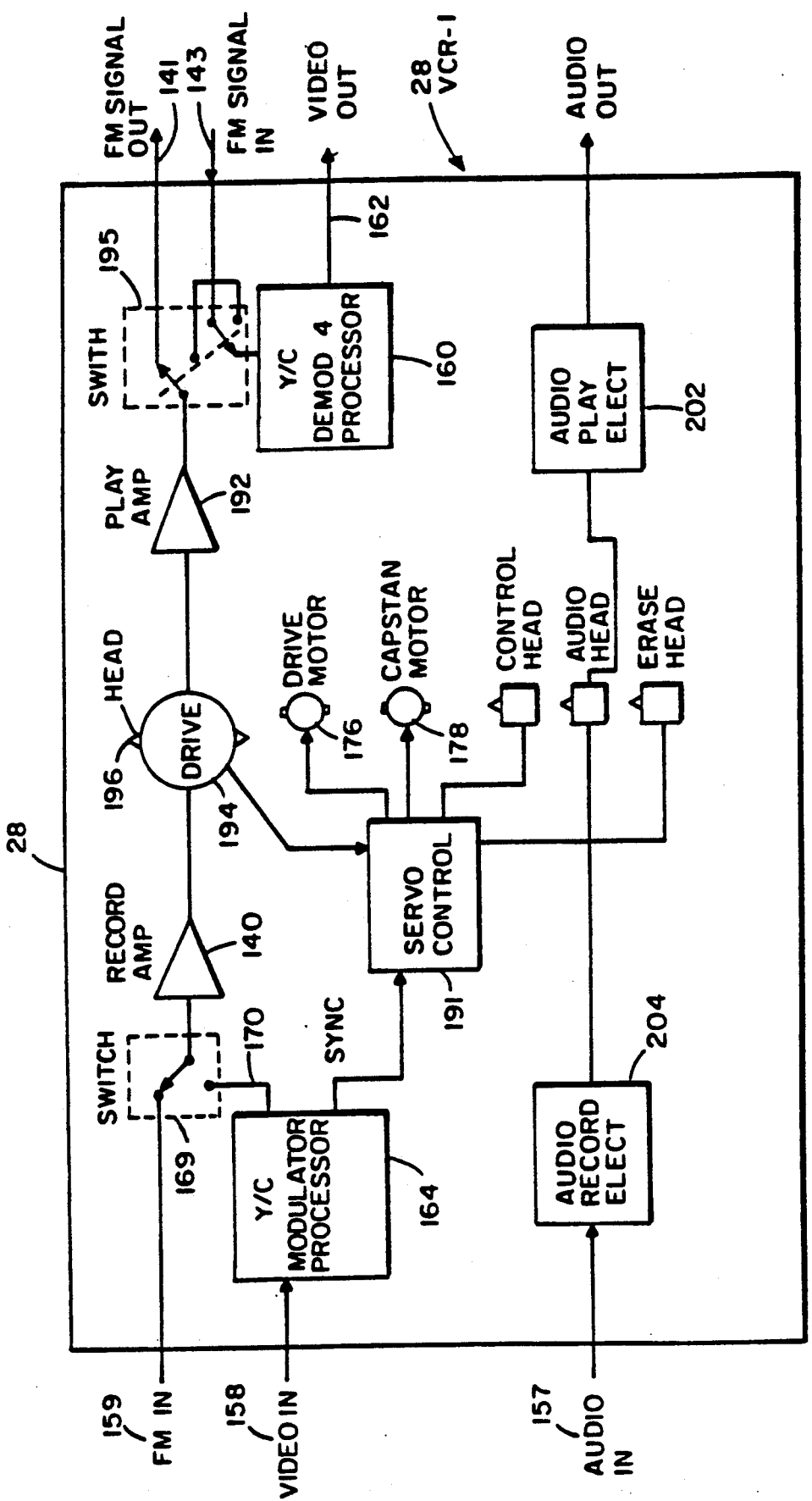
FIG. 3B shows a more detailed level of the FIG. 3A circuitry utilized with Deck A of FIG. 3A.
Figure 3C:
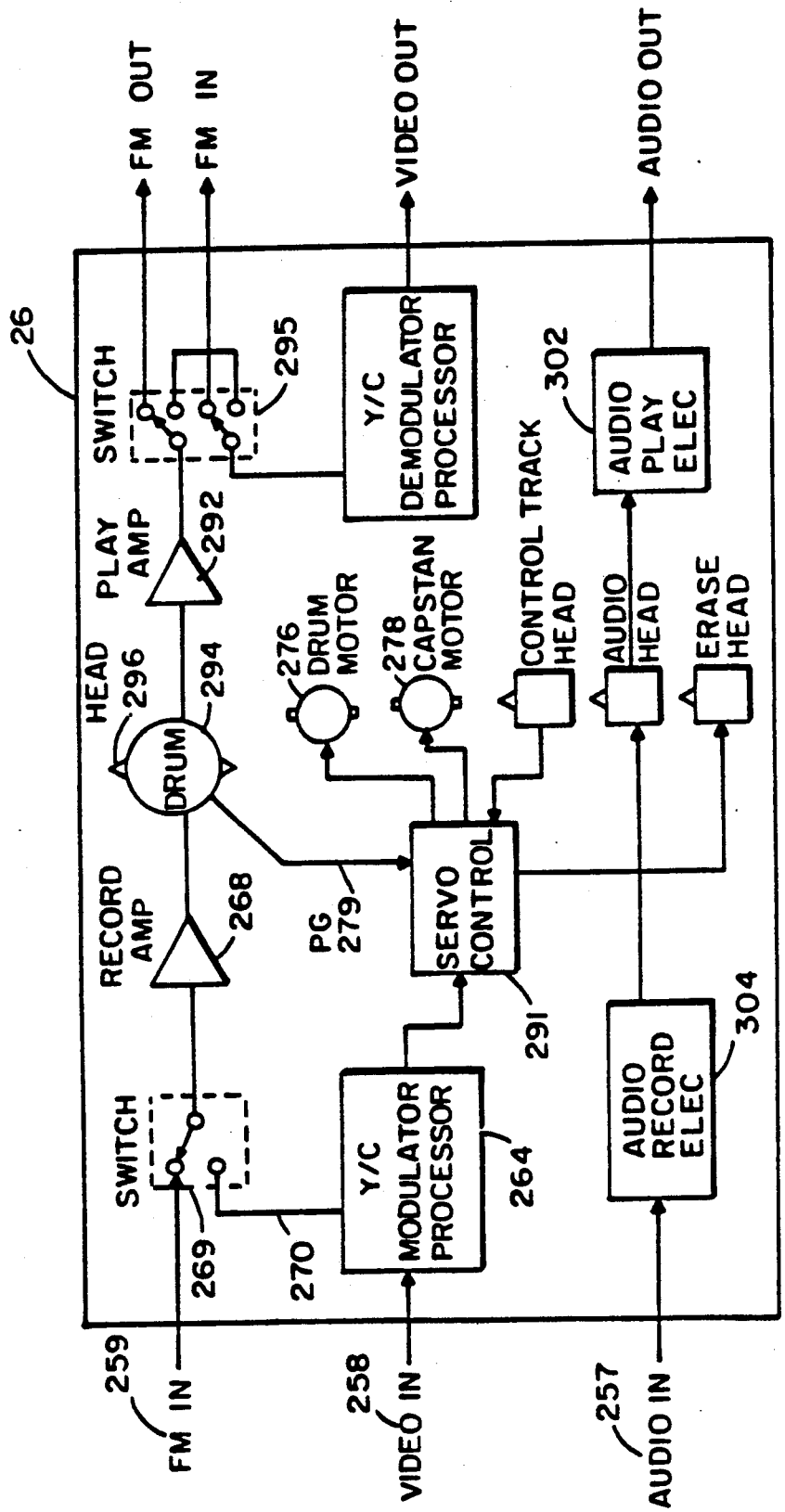
FIG. 3C shows a more detailed level of the FIG. 3B circuitry utilized with Deck B of FIG. 3A.

Referring now particularly to FIG. 3, a second embodiment of a dual-deck VCR system's basic circuit is diagramatically illustrated in which the ports 26 and 28 provide access to decks A and B, both of which comprise VCR play and record capability and may be configured for similar or different VCR formats. VCR deck-A (VCR-A) is adapted to communicate with the TV tuner 20 for receiving a TV signal, a video input that is directed to the isolation amplifier 22, and a camera video input that communicates with the system through the socket 24. In order to select the input into VCR-A, a first (selector) switch 30 is provided and includes switch positions numbers 1-4. Switch position #1 for selection switch 30 directs the signal from the TV tuner into VCR-A. Switch position #2 directs the signal from the isolation amplifier 22 into VCR-A, and switch position #3 directs the signal from the camera video into VCR-A. A second (output) switch 32 and switch positions 1-4 therefor are disposed in parallel relation with respect to switch 30 and the switch positions thereof and directs the signals from the inputs into VCR deck B (VCR-B). Thus, the input signal from the TV tuner is directed to VCR-B through switch position #1 of the selection switch 32, while the signal from the isolation amplifier 22 is directed to VCR-B through switch position #2 of the selection switch 32, and switch position #3 directs the signal from the camera video to the VCR-B.

Both VCR-A and VCR-B are arranged to not only record but to play back. One purpose of the dual system as illustrated in FIG. 3 and as described hereinabove is to enable a VHS cassette as located in VCR-A to record information from a Beta tape as located in VCR-B. The contrary circumstances are also available, wherein a Beta system with a Beta tape located in the deck of VCR-B can record information from a VHS tape as located in the deck of VCR-A. Switch position #4 in both of switches 30 and 32 provide for connecting the output of VCR-A with VCR-B, or conversely, connecting the output of VCR-B to VCR-A. Thus, it is possible to record ("dub") video/audio information from a tape located in VCR-A onto a tape located in VCR-B; conversely, it is possible to record such information from a source tape located at VCR-B onto a target tape located at VCR-A. The system can also be used for simultaneously recording from a broadcast or auxiliary input to the videocassette tapes in both decks. The above described structure can also be used with minor modification, now apparent, to dub between source and target tapes of different formats or to apply an external source signal for recording simultaneously to videocassette tapes of different formats at the two decks. The available formats include, but are not limited to, 8 MM, VHS, S-VHS, Beta, ED-Beta.

FIG. 3A shows the functional blocks needed for the tasks using each of VCR-B and VCR-A decks for such dual purposes of playing or recording as in FIG. 3. The functional keyboard can be programmed to either play or record from the VCR-A circuit. A frequency modulated (FM) signal, 159 can be recorded onto a tape videocassette tape loaded into deck VCR-A via switch 169 and the heads 196 on drum 194. A second FM signal 170 can be selected for recording through switch 169. This second signal is formed by modulating an input video signal 158 with the Y/C Modulator/Processor 164. The Y/C modulator/processor 164 transforms the video into an FM signal suitable for recording onto magnetic tape by conversion of the Y signal to FM, which is well known in the art. The FM signal on the tape is a luminance, referred to as Y, signal. The tape also contains a chrominance signal (C), which is a heterodyned color signal in accordance with NTSC Standard (phase and amplitude modulated). Heterodyning mixes two higher frequency signals, producing a lower frequency signal equal to the difference between the two higher frequency signals wherein all the information contained in the higher frequency signals is preserved in the side bands of the lower frequency signal.

The Y signal which carries all the luminance and TV deflection synchroniztion information, is direct FM modulated on a carrier to a frequency spectrum above 1 MHZ. The C signal carries the color information and is heterodyned into a frequency spectrum below 1 MHZ. These two signals are separated by a high pass filter and a low pass filter. The Y-FM/C629 signal 159 has corresponding parts.

The Y/C modulator/processor also extracts the vertical synchronization information from the video signal 158. This information is input to a servo control 191 which forms that signal which drives the drum motor 176 and the capstan motor 178 which drive the drum 194 and the capstan, respectively. All the resulting signal recorded on the tape must be synchronized in order to produce a tape suitable for viewing.

When a VCR tape is played on deck VCR-A the FM signal is buffered by the amplifier 192 and can be sent out through switch 195 or through the Y/C demodulator/processor 160 which reproduces the video 162.

The description of FIG. 3B for the circuit of deck VCR-B, corresponds to that of VCR-A (FIG. 3A). Consider a pre-recorded tape loaded in deck VCR-A and a blank videocassette tape in deck VCR-B and the function keyboard 197 being programmed to duplicate from the videocassette tape in deck VCR-A.

Figure 4A:
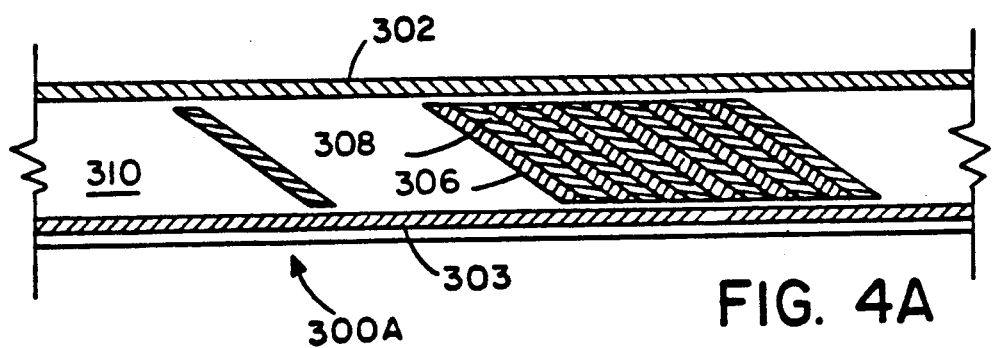
FIGS. 4A-4C show the organization of information recorded onto magnetic videocassette tapes in speed modes of SP and EP respectively.
Figure 4B:
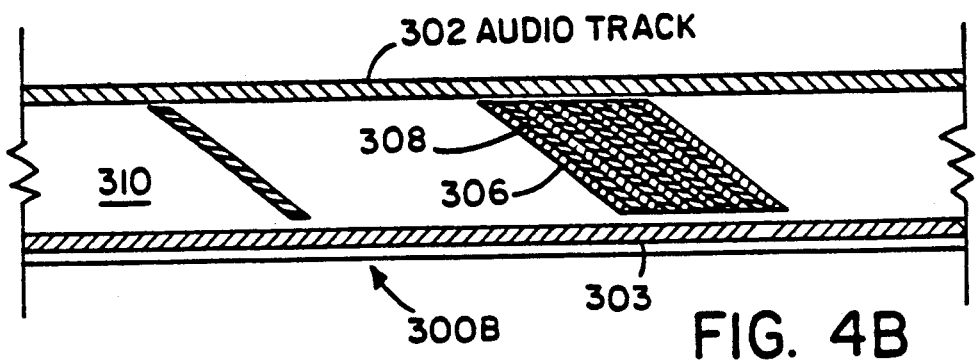
Figure 4C:
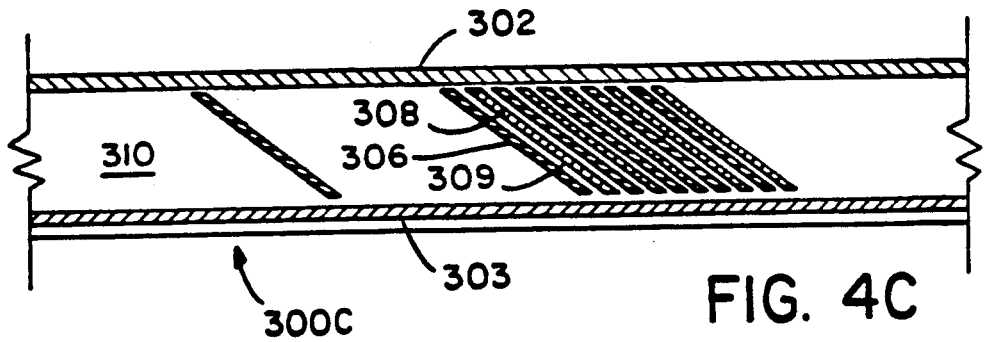

Referring to FIGS. 4A-4C, the format of signals recorded on a magnetic tape with and without utilization of the present invention is shown. The signal on tape 300A, 300B, 300C (of FIGS. 4A-4C, respectively) has three parts. The audio signal is recorded on 1-2 audio-tracks (302) at the specified level using an AC bias current recording system. The control track 303 is recorded along the other edge of the tape and contains the vertical synchronization signals. Each video track 306 contains one complete TV field including the luminance, chrominance and the TV deflection synchronization signals. Track 308 contains the successive TV field information following 306. In the prior art situation of FIG. 4A, the two tracks 306 and 308 are physically adjacent and tend to overlap (either physically overlap or virtually overlap—i.e., where the magnetic field effects of adjacent tracks overlap). This situation of FIG. 4A occurs under the conditions of standard play (SP) tape speed using standard play (SP) recording heads. FIG. 4B illustrates this same relationship under the conditions of extended play (EP) tape speed using extended play (EP) recording heads. Both FIGS. 4A and 4B illystrate that no guard band exists between recording tracks, and in fact physical or virtual overlap of these magnetic fields occur in both of these conditions.

A significant improvement in this condition is achieved by this invention. FIG. 4C illustrates that guard bands are established between sequential recording tracks 306 and 308. This eliminates the physical or virtual overlap of magnetic fields and resultant degradation of information. The new topographical relationship is accomplished under the condition of standard play (SP) tape speed using extended play (EP) recording heads, the the FM signal dub process as described hereinafter. However, it is the establishment of the guard band which enables practical utilization of FM dubbing. Such utilization, in turn, enables a system which affords repeatable high fidelity of dubbing avoiding progressive generational losses and avoiding cost, complexity and counterproductivity of additional modulation (coding)-/demodulation (decoding) subassemblies.

The FM signal from the pre-recorded tape is read by the heads 196 (FIG. 5) amplified and buffered by play amp 192 and fed to the dub processor 111, which will be described below. The play out signal 140 from the dub processor 111 is fed back through switch 195 to the Y/C demodulator/processor 160. The resulting video signal 162 is input to the Y/C modulator 264 in deck VCR-B. This processor extracts the synchronization signals required by the record mechanism. This processor also regenerates the FM signal from the video, but this signal is deselected by switch 269. Instead switch 269 selects the output from the dub processor 111 via line 138, which is a Y-FM signal and C-629 which has not been demodulated.

The synchronization pulses extracted by 264 are needed by the capstan and the drum motors of deck VCR-B, 26 to properly synchronize the information being recorded onto the tape with the actual drive mechanism. A sync signal 271 is input to the servo control 291 where the appropriate specific signals are generated for the drum motor 276 and the capstan motor 278, which maintain synchronization as described earlier.

The approach also preserves the copy protection capability. It is practical and cost effective to insert a variety of copy protection means in the signal transfer path to cope with essentially unmodulated FM (apart from relatively minor modulation/demodulation associated with the copy protection. The latter demodulate/modulate (usually related only to sync' pulses) does not diminish the FM signal quality and (re)recording thereof. The video information recorded on each track undergoes little or none of the demodulate/modulate processes under most copy protection systems.

The FM signal 138 from the dub processor 111 is input through the switch 269 to the record amplifier 268 and drives the head 296 on the record drum 294. As explained above, this FM signal has not been unnecessarily demodulated and modulated.

The audio from the tape in deck VCR-A is recorded onto the object tape in deck VCR-B via the play electronics 202 and record electronics 304.

Figure 5:
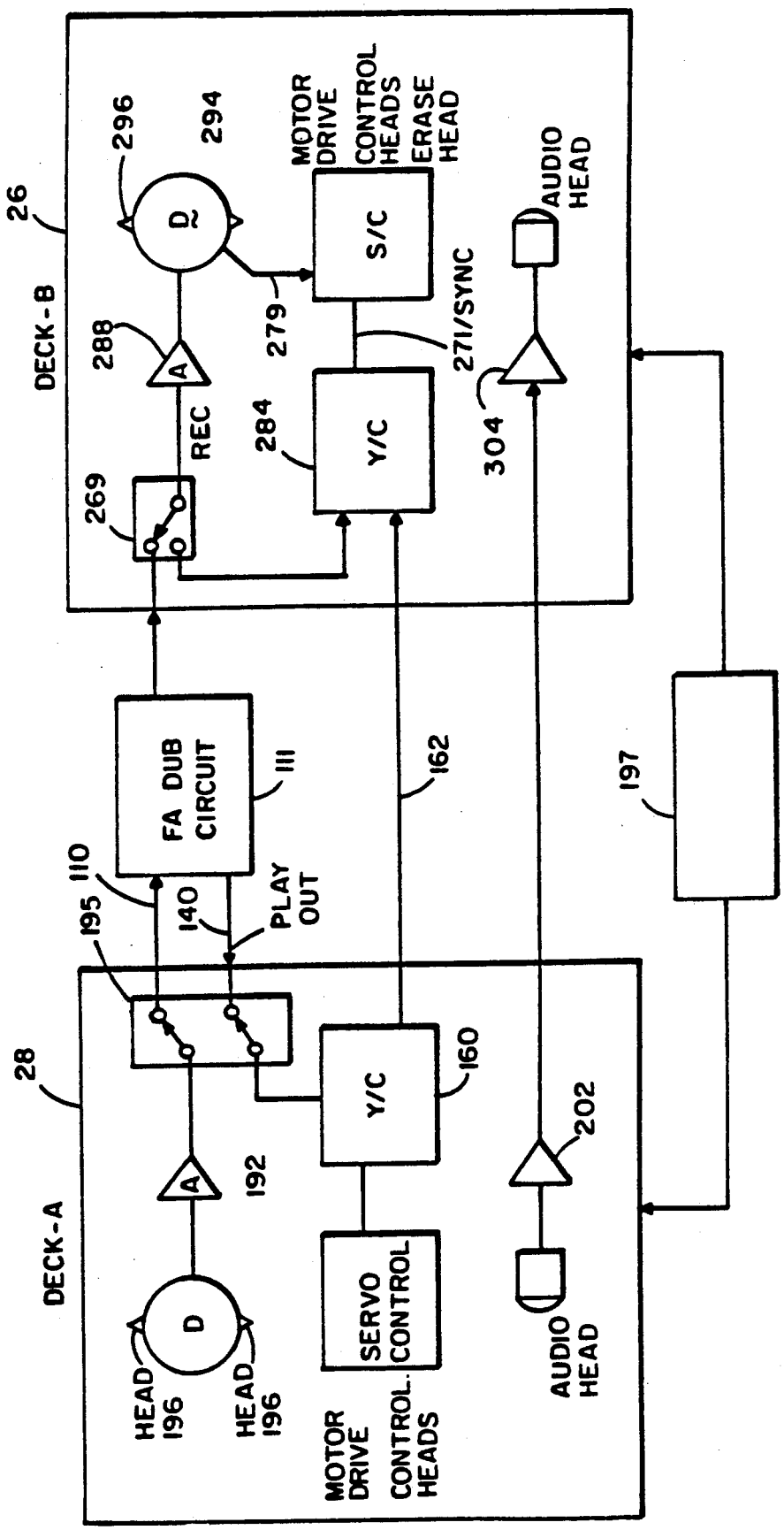
FIG. 5 is a block diagram of a duplicating sub-system usable with various embodiments of dual-deck VCR systems, e.g., the one shown in FIG. 3A, showing the relationship of the duplicating circuitry and the play and record heads and the formation of the synchronous signals used for the motors which drive the videocassette tape on which information is being recorded (target tape)
Figure 6:
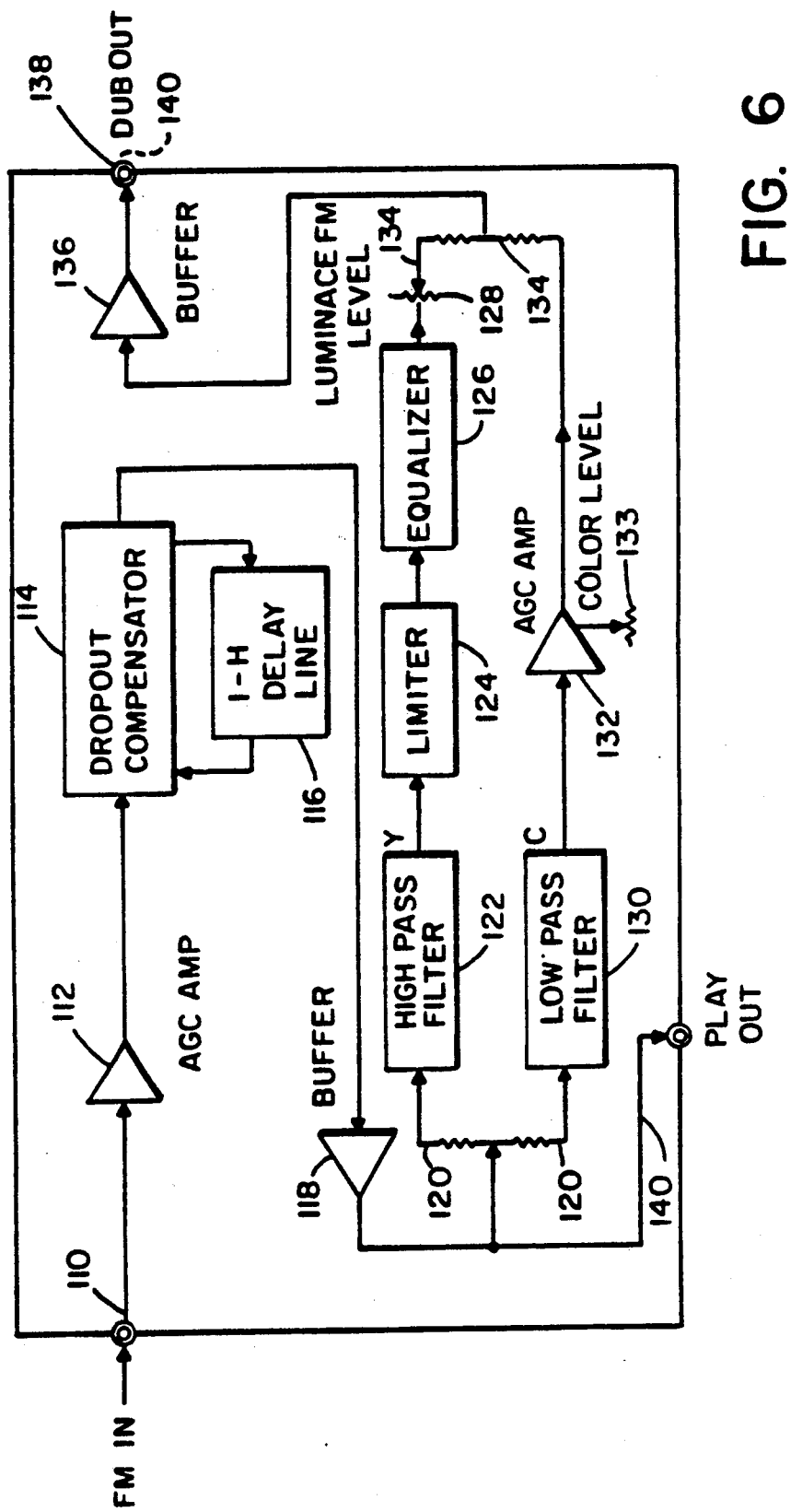
FIG. 6 is a circuit block diagram of the FM dub processing portion of the duplicating circuitry of FIG. 4.

FIG. 6 shows further aspects of the dub processor. The FM signal is input on line 110 to an automatic gain controlled (AGC) amplifier 112. This amplifier 112 maintains a given signal level by changing the gain in response to the average signal rising or lowering. The resulting signal is fed to a "drop out copensator" 114. The circuitry includes a delay line 116 where the previously received FM signal, which is equivalent to one TV horizontal line, is stored. If a "drop out" or loss of signal is detected the information stored on the previous line replaces the lost information until the "drop out" disappears. This signal is buffered by 118 and fed to the Y/C processor 160 (FIG. 4) on line 140 (FIG. 5) and also fed through a signal splitter represented by the resistors 120 (FIG. 6). The circuitry following this signal splitter processes the FM signal to prepare the signals for recording onto another videocassette tape.

As described above the FM signal on the tape has two parts, the luminance and the chrominance, which are easily separated by filters. The chrominance (color) carrier at 629 KH is separated by a low pass filter 130 and sent through the AGC amplifier 132 where the signal level can be set by a color level control 133.

The high pass filter 122 separates out the luminance FM signal, which passes through a common FM limiter 124. This removes any amplitude variations from the FM luminance signal preserving only the frequency information. This signal is then fed through a common equalizer 126, which compensates for the tape characteristic that higher frequency signals will have a higher amplitude when read from the tape than lower frequency signals all else remaining constant. The luminance FM signal level can be set at 128 and this, together with the setting of the chrominance signal 133 level, can compensate for proper record level requirements. The levels can be set so as to ensure that the signal when read back from the tape will contain reasonable levels for the color and the luminance signals. Both the color and luminance signals are added together through the resistors 134 and buffered by 136. The resulting signal is suitable for direct connection to a record amplifier 168 as shown in FIG. 5. The resulting signal is added back with the color signal through the other resistor 134.

Figure 7:
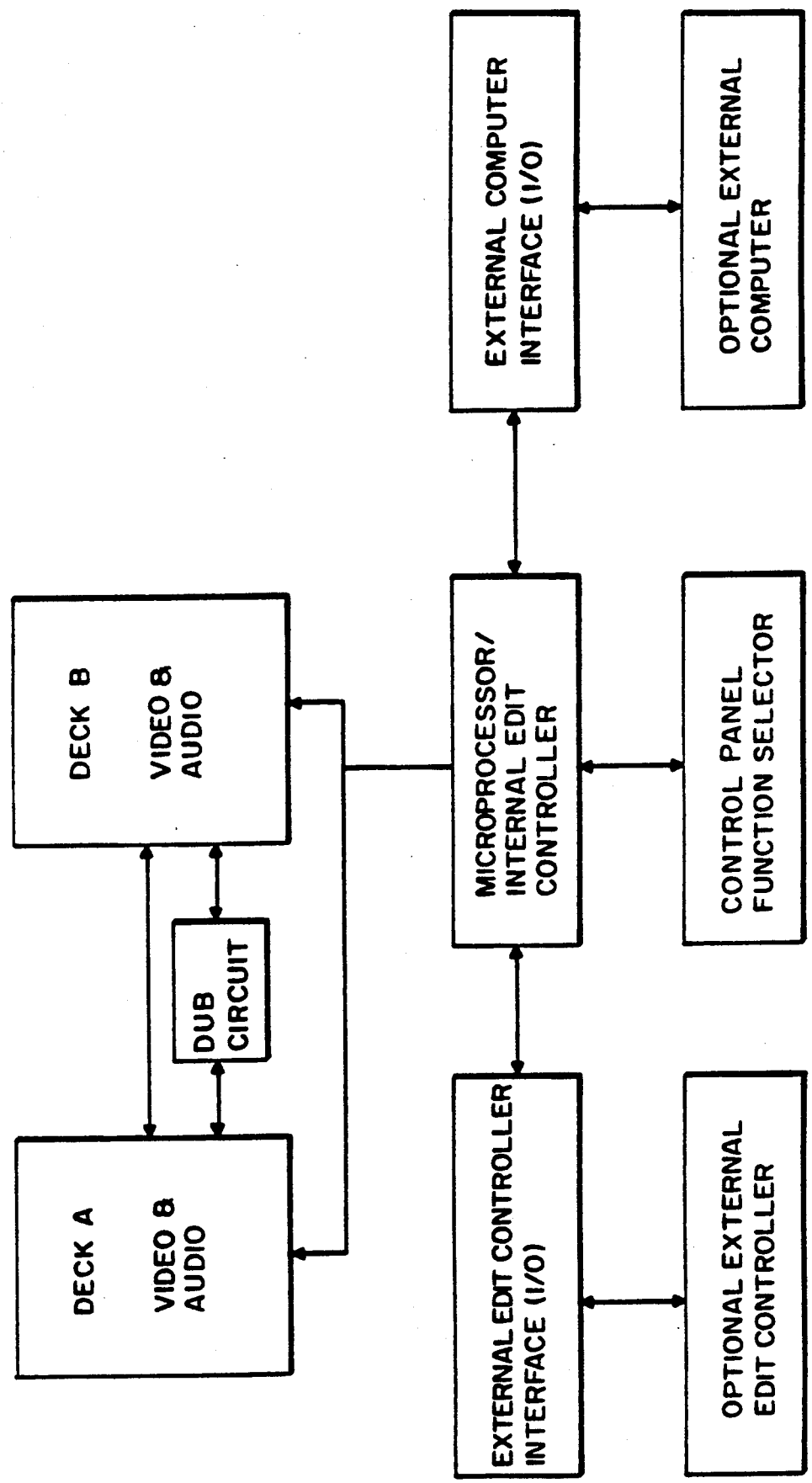
FIG. 7 is a system block diagram modified to include external controller means.

FIG. 7 is a block diagram of an enhanced system form, of the previously described embodiments, in which simple or sophisticaled editing capabilities can be achieved (a) through an internal or external microprocessor which serves as an edit controller and video/audio switcher; (b) via an edit controller which permits pre-set "in" and "out" edit points, and/or (c) via means permitting an automated preview of the edit function. Additionally, the FIG. 7 system can be equipped with an interface that allows the optional use of an external computer for automated control of both decks and all simultaneous functions. This external computer interface may be selected from the class comprising but not limited to RS 232, SCSI, IEEE-488, and RS 422 types, or other classes of interfaces.

The forms of external control can include, e.g., jog wheel hand controls, voice or motion activation, mouse controllers, button or switch panels, tablets, etc.

The edit control, whether effected by internal or external means, can be constructed and arranged to effect in/out edit points, synchronized preview of tentative edit choices, text and/or graphic and/or audio overlays, audio/video section deletions, addins and transfers, simple analog-to-digital conversion (beginning with the readily accessible and convertible FM signal) for computer modification and digital-to-analog conversion (beginning with the readily accessible and convertible FM signal) for computer modification and digital-to-analog reconversion and restoration on another tape. It will now be appreciated that there is a synergistic relation among the various elements of the system, including the following features:

(1) Whereas a single videocassette tape has a limited capability to receive edit processing, transfers can be made fron a source tape to a target tape (or from a source tape and auxiliary inputs) to a target tape going from, say, Deck VCR-A containing the source to Deck VCR-B containing the target; the roles can be reversed, with Deck VCR-B as source with the old videocassette tape (or a new blank one inserted) in Deck VCR-A, now the target, for a further series of edit steps.

(2) This pour back and forth sequence with a feasible set of edit steps at each pour using a series of inexpensive videocassette tapes and an inherently inexpensive and easy-to-understand-and-operate apparatus and method (for educational, entertainment and/or business purposes, all feasible at mass market levels) is enabled by the low loss, dub process and controller accommodating capabilities, described above.

(3) Consistent with the foregoing, copy and/or non-edit protection can also be provided for special classes of source tapes and the system as a whole is also utilizable for the various basic purposes set forth in the above cited Dunlap-Lang patent.

The above described embodiments and varriants of structure, operation, features, uses and advantages can be extended within the scope of the present invention to commonly controlled arrays of Deck A/Deck B dual deck systems and/or to tri-deck, four deck, etc. systems.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A dual deck VCR system including two videocassette decks, each including playback electronics to effect playback of audio/video/control information from a videocassette therein using read heads and associated frequency modulation and at least one of said decks including means for recording such information to a videocassette therein, (a) means for selectively providing a playback output of one or the other of said decks of the system, (b) means for receiving and providing a broadcast signal to the system, (c) user controlled switching means to effect selective coupling of the broadcast signal to one of said decks, one of said decks to the output and one deck to the other, (d) means for receiving the frequency modulated signal from a read head within a first deck's playback electronics;

(e) means for storing part of said received signal, said part being at least equivalent to one complete television horizontal line, (f) means for detecting when any part of said received signal has been lost, and for replacing said lost signal with a corresponding signal from an adjacent previous television line from said stored signal, resulting in a signal with no drop outs;

(g) means for receiving said resulting signal and for separating the chrominance signal from the luminance signal;

(h) means for adjusting the relative amplitudes of said chrominance and luminance signals to compensate for tape read head output versus frequency characteristics, (i) means for combining said chrominance and luminance signals;

(j) means for providing said combined signal to record structure within a second deck's recording electronics via said switching means, (k) means for extracting synchronization information from said frequency modulated source;

(l) means for forming from said synchronization information synchronized drive signals for the first deck's mechanical drive mechanisms and for maintaining synchronization of the record heads, capstan motor, control head and drum motor with the information recorded on the tracks of said videocassette tape;

(m) means for synchronously recording audio from said first deck onto said cassette in said second deck, so that resulting audio and associated video information is synchronized as on said first videocassette; resulting in a duplicate of said first videocassette from said first deck on said cassette in said second deck;

(n) means for azimuth video information recording in the second deck; and (o) speed control means and a related miniaturized recording head gap of said second deck to establish guard bands between adjacent tracks.

2. A dual deck VCR system in accordance with claim 1 wherein both decks are arranged with recording capability to serve as second decks, each constructed and arranged to generate said guard bands.

* * * * *